United States Patent Office 3,752,779
Patented Aug. 14, 1973

3,752,779
ANTICORROSIVE HOT-DIP STRIPPABLE COATING MATERIAL AND METHOD FOR PRODUCING SAME
Mieczyslaw Maciejewski, ul. Warynskiego 6 m. 16, Warsaw, Poland
No Drawing. Continuation-in-part of abandoned application Ser. No. 613,107, Feb. 1, 1967. This application Aug. 14, 1970, Ser. No. 63,936
Claims priority, application Poland, Feb. 3, 1966, P 112,777
Int. Cl. C08d 5/20; C09d 7/02
U.S. Cl. 260—23 H        5 Claims

ABSTRACT OF THE DISCLOSURE

An anticorrosive hot-dip strippable coating material is formed by mixing a thermoplastic polymer (polypropylene) with a plasticizer therefor at an elevated temperature wherein the polypropylene comprises 2 to 30% by weight of the whole mixture.

CROSS-REFERENCES TO RELATED APPLICATIONS

This application is a continuation-in-part of copending application Ser. No. 613,107, filed Feb. 1, 1967 and now abandoned.

BACKGROUND OF THE INVENTION

Field of the invention

The present invention relates to a method for producing an anticorrosive hot-dip strippable coating material and to the coating material itself. The coating material is intended for use in the protection of metal products against corrosion and mechanical damage during storage and transportation thereof.

Prior art

Strippable coating materials having anticorrosive properties which were heretofore known are primarily based on waxes or bitumic substances. It has been found, however, that the aforesaid coating materials lack good mechanical properties and are not sufficiently resistant to weather.

Considerably better in this respect are the anticorrosive strippable coatings produced thereafter and which are based on cellulose derivatives, polystyrene and polyethylene.

The common defect, however, of all these anticorrosive coating materials resides in their low transparency, as a consequence of which it is difficult to control the surface of the coated products with regard to the effectiveness of their protection against corrosion. Periodical control is possible only after removal of the coating from the surface of the product.

The essential characteristic of all the known anticorrosive compositions is that the oily components sweat out from the composition during the formation of the coating and form an additinal surface film between the metal product and the coating which protects the metal product against corrosion in the event of damage of the basic coating.

It is not desirable, however, for the oily components of the composition to sweat out to the exterior of the basic coating, i.e., to the outside atmosphere. This disadvantage occurs with the known anticorrosive strippable coating materials which are based on ethyl-cellulose and polyethylene.

On the other hand, coatings based on polystyrene and polyethylene and paraffin are dry compositions and in consequence, represent only a secondary protcetive material which cannot be compared in any meaningful way with the compositions containing oily components.

Apart from the above, the main disadvantage of all the known anticorrosive compositions is the relatively low limit of temperature at which the coating material can be applied, i.e., not exceeding 70° C.

DETAILED DESCRIPTION OF THE INVENTION

The present invention, which relates to a method for producing anticorrosive hot-dip strippable coating material based on softened polypropylene, and to the coating materials as well, is intended to overcome all the above disadvantages of the known compositions of this type.

The coating materials of the invention, which are based on polypropylene and particularly those which are based on polypropylene containing more than 5% of an atactic fraction, are completely transparent. Moreover, they belong to the class of coating materials which educe oily components differing, however, from the known strippable coating materials by their ability to sweat out the oily components from the composition in one direction only, i.e., towards the protected surface. Thus, the outside surface of the coating material remains dry and clean, while the oily substances educed from the composition form an additional surface film for protecting the metal. This additional film is between the surface being coated and the coating material. This is an unexpected and very advantageous property of strippable coating materials based on polypropylene.

One of the other advantages of the coating material of the invention is in the fact that the coating material can be applied at high temperatures, exceeding 100° C. Due to this fact, the coating material based on polypropylene can be used not only for protection of metal products which are exposed to weather, but for their protection as well in certain media of chemical processes carried out at a temperature of about 100° C.

According to the method of the invention, the polypropylene is dissolved in a plasticizer therefor, or in a mixture of plasticizers and additional substances at an elevated temperature. By elevated temperature is meant a temperature above about 60° C. The amount of polypropylene in the mixture of polypropylene-plasticizer varies from 2 to 30% by weight, preferably 10–25%.

The term "polypropylene" as used herein comprises isotactic polypropylene or a mixture of isotactic polypropylene and atactic polypropylene, in which mixture the isotactic polypropylene content amounts to at least 50% of the total.

By the term "plasticizers" is meant all those substances which are generally used for softening plastics, such as high-boiling esters of carboxylic acids, esters of polycarboxylic acids, esters of carbonic acid, i.e., reaction products of phosgene and alcohols or phenols, polymeric plasticizers such as oligomers or telomers of styrene, coumarone indene resins modified with phenol, condensation products of aromatic compounds with formaldehyde, polyethyleneadipate and polyethylenesebacate, chlorinated diphenyl, chlorinated polyphenylenes, alkylarylic ethers or their derivatives.

The plasticizers referred to above act not only as substances softening polypropylene, but at the same time they induce the formation of a surface film which additionally protects the metal product and consequently perform the same role as does the mineral oil used in the compositions based on ethyl-cellulose.

The additional substances referred to above as being mixed with the plasticizer comprise vegetable, mineral and synthetic oils, paraffin, ceresine, antioxidants, organic acid salts, corrosion inhibitors, synthetic polymers, resins and waxes.

Depending on the purpose for which the mixture is intended, its composition can be varied to a large extent:

| | Parts by weight |
|---|---|
| Polypropylene | 2–30 |
| Plasticizers | 10–99 |
| Additional substances | 0–50 |

The mixture of polypropylene and plasticizers forms at least 50% by weight of the whole composition.

There will now follow a more detailed description of the above-mentioned plasticizers and said additional substances.

Among the plasticizers useful in this invention there are included:

(1) high boiling esters of carboxylic and polycarboxylic acids such as dibutylphthalate, 2-ethylhexylphthalate and dioctylphthalate;
(2) esters of carbonic acid, i.e., reaction products of phosgene and alcohols or phenols such as dioctylcarbonate.

There are also included polymeric plasticizers such as (3) oligomers and telomers of styrene. These are the products of styrene telomerization in the presence of formaldehyde which are oligomeric compounds obtained by polymerizing styrene in the presence of formaldehyde and acetic acid according to the method of Coffman, J. Am. Chem. Soc., 76, 2685 (1954);
(4) coumarone—indene resins modified with phenol such as Nevillac 10, a product of the Neville Chemical Company;
(5) condensation products of aromatic compounds and formaldehyde such as xylene-formaldehyde resins;
(6) polyethylene adipate and polyethylene sebacate, both having molecular weights of about 3,000–12,000;
(7) chlorinated diphenyls and chlorinated polyphenylenes; and
(8) alkylarylic ethers and derivatives thereof such as "Cardonal Ethers," a product of The Irvington Varnish and Insulator Division of the 3M Company, which is a mixture of ethers of the formula $$C_{15}H_{27}-C_6H_4-OC_2H_5$$

Among the additional substances which may be mixed with the polypropylene and the plasticizer are the following:

(a) oils such as vegetable, mineral and synthetic oils including caster oil and paraffin oil;
(b) paraffin;
(c) ceresin which is a mineral wax (see Merck Index, 7th ed., page 224);
(d) waxes such as Synthetic Wax OP, a Polish product melting at about 80° C. This is a mixture of high melting hydrocarbons, free fatty acids (above $C_{18}$) and their fatty alcohol esters;
(e) antioxidants such as phenyl-α-naphthylamine;
(f) organic acid salts such as calcium stearate;
(g) corrosion inhibitors such as "Duomeen T" an n-alkyl-trimethylenediamine produced by the Armour Chemical Company; Jonox 220, an alkylated dihydroxydiphenylmethane;
(h) synthetic polymers and resins such as polyisobutene, octylphenol-formaldehyde resin, methyl polymethacrylate and butyl polyacrylate; and colophony, colophony methyl ester, colophony glycerine ester, hydrogenated colophony methyl ester, hydrogenated colophony glycerine ester; and Alkydal C25 which is an alkyd resin produced by the Chemische Werke Albert.

There will now follow several examples of coating compositions according to the invention.

EXAMPLE 1

15 kg. of polypropylene and 85 kg. of dibutylphthalate are loaded into a reactor. During continued or periodical mixing, the composition is heated at a temperature of about 140–200° C. until the polypropylene is completely dissolved and then the mixture is poured into containers and cooled to room temperature.

The formulations of Examples 2–13 and 15 which are carried out in the same manner as is Example 1 are given below.

EXAMPLE 2

Polypropylene—15 kg.; dibutylphthalate—64 kg.; paraffin oil—2 kg.; octylphenol—1 kg.

EXAMPLE 3

Polypropylene—20 kg.; dibutylphthalate—30 kg.; polyethylene adipate (mol. wt. 3,000–12,000)—40 kg.; carbonic acid ester (dioctylcarbonate)—10 kg.

EXAMPLE 4

Polypropylene—20 kg.; dibutylphthalate—35 kg.; chlorinated diphenyl—10 kg.; oleyl alcohol—15 kg.; diisopropyl naphthalene—10 kg.; caster oil—15 kg.; paraffin—5 kg.

EXAMPLE 5

Polypropylene—20 kg.; dibutylphthalate—30 kg.; polystyrene resin—20 kg.; Cardanol ethers—30 kg.

EXAMPLE 6

Polypropylene—20 kg.; dibutylphthalate—40 kg.; xylene-formaldehyde resin—20 kg.; Nevillac 10—10 kg.; styrene telomerization product with formaldehyde—10 kg.

EXAMPLE 7

Polypropylene—20 kg.; dibutylphthalate—60 kg.; calcium stearate—2 kg; polyisobutene—18 kg.

EXAMPLE 8

Polypropylene—20 kg.; dibutylphthalate—59 kg.; paraffin oil—20 kg.; octylphenol—1 kg.

EXAMPLE 9

Polypropylene—20 kg.; dibutylphthalate—79 kg.; octylphenol—1 kg.

EXAMPLE 10

Polypropylene—18 kg.; dibutylphthalate—21 kg.; dioctylphthalate—20 kg.; polyethylene sebacate (mol wt. 3,000–12,000)—40 kg.; phenyl-α-naphthylamine-1 kg.

EXAMPLE 11

Polypropylene—12 kg.; dibutylphthalate—38 kg.; calcium stearate—50 kg.

EXAMPLE 12

Polypropylene—10 kg.; dibutylphthalate—40 kg.; polyisobutene—50 kg.

EXAMPLE 13

Polypropylene—20 kg.; dioctylphthalate—35 kg.; Nevillac 10–35 kg.; Duomeen T—10 kg.

EXAMPLE 14

To a mixer heated to 200° C., isotactic polypropylene—15 kg.; atactic polypropylene—4 kg.; and dibutyl phthalate—34 kg. are changed. While stirring, the polypropylene is completely dissolved. Thereafter, Staybelite Ester 10 resin (hydrogenated colophony glycerine ester)—30 kg., 2-ethylhexyl phthalate—14 kg., calcium stearate—1 kg., as well as the antioxidant Jonax 220 (alkylated dihydroxydiphenyl-methane)—1 kg. are added. After obtaining a homogeneous composition, the mixture is poured into suitable molds. In the mixture according to this example, polypropylene does not show any practical tendency to crystallization.

EXAMPLE 15

Polypropylene—19 kg.; styrene telomerization product with formaldehyde—80 kg.; octylphenol—1 kg.

The anticorrosive strippable coating material can also be prepared according to this invention by dissolving the polypropylene in part of the other components of the composition at a temperature of 80–200° C., with the remainder of the components being added at a temperature below 80° C., as in Examples 16–17.

EXAMPLE 16

20 kg. of paraffin, 20 kg. of polypropylene and 1 kg. of octylphenol are loaded into a reactor. The contents are heated at a temperature of 100° C. until the polypropylene is completely dissolved, then the mixture is poured into a mixer and mixed at a temperature below 80° C., together with 59 kg. of dibutylphthalate.

EXAMPLE 17

15 kg. of paraffin oil, 10 kg. of dibutylphthalate, 20 kg. of polypropylene and 1 kg. of octylphenol are loaded into a reactor. The contents are heated at a temperature of 140° C. until the polypropylene is completely dissolved and is then poured into a mixer and mixed at a temperature below 80° C. together with 5 kg. of paraffin oil and 39 kg. of dibutylphthalate. The product obtained is in the form of a paste.

EXAMPLE 18

79 kg. of dibutylphthalate, 1 kg. of octylphenol and 20 kg. of powdered polypropylene are mixed in a mixer at a temperature below 80° C. The product obtained is in the form of a paste.

EXAMPLE 19

19 parts by weight of isotactic polypropylene, 50 parts by weight of dibutylphthalate, 30 parts by weight of colophony and 1 part by weight of octylphenol (antioxidant).

EXAMPLE 20

19 parts by weight of isotactic polypropylene, 20 parts by weight of dioctylphthtalate, 30 parts by weight of dibutylphthalate, 30 parts by weight of colophonyl methyl ester (Abalyn) and 1 part by weight of 4,4'-methylene-bis(2-6-t-butylphenyl) (antioxidant).

EXAMPLE 21

19 parts by weight of isotactic polypropylene, 20 parts by weight of dioctylphthalate, 30 parts by weight of dibutylphthalate, 30 parts by weight of colophony glycerine ester (Abrac-ester-gum-glycerol abietate) and 1 part by weight of octylphenol.

EXAMPLE 22

19 parts by weight of isotactic polypropylene, 30 parts by weight of dioctylphthalate, 30 parts by weight of dibutylphthalate, 10 parts by weight of methyl polymethacrylate and 1 part by weight of dioctyl phenol.

EXAMPLE 23

19 parts by weight of isotactic polypropylene, 30 parts by weight of dioctylphthalate, 40 parts by weight of dibutylphthalate, 10 parts by weight of polybutylacrylate and 1 part by weight of dioctyl phenol.

EXAMPLE 24

The same procedure as in Example 14 is followed except that in place of the hydrogenated colophony glycerine ester, there is used the methyl ester of hydrogenated colophony (Hercolyn).

In order to cover metal products with the coating material of this invention, they are dipped for a few seconds into the molten coating material at a temperature of about 160°–200° C.

What is claimed is:

1. An anticorrosive strippable coating material comprising the solidification product of polypropylene dissolved in at least one plasticizer therefor, the polypropylene being isotactic polypropylene or a mixture of isotactic and atactic polypropylene in which the isotactic polypropylene constitutes at least 50% of the total polypropylene, the polypropylene being present in an amount of 15% by weight based on the total weight of polypropylene and plasticizer, said plasticizer being a high-boiling ester of a carboxylic or polycarboxylic acid; an ester of carbonic acid; a styrene telomer; coumaroneindene resin modified with phenol; the condensation products of aromatic compounds and formaldehyde; polyethylene adipate and sebacate; chlorinated diphenyls; chlorinated polyphenylenes; or alkylarylic ethers.

2. A material as claimed in claim 1 further comprising one further substance selected from the group consisting of vegetable, mineral and synthetic oils, organic acid salts, resins and waxes mixed with the polypropylene and plasticizer in an amount of less than 50% by weight based on the total weight of the mixture.

3. A material as claimed in claim 4, wherein the high-boiling ester is dibutylphthalate or dioctylphthalate, the ester of carbonic acid is dioctylcarbonate, the condensation product of an aromatic compound and formaldehyde is a xylene-formaldehyde resin, and the alkylarylic ethers are a mixture of ethers of the formula $$C_{15}H_{27}-C_6H_4-OC_2H_5.$$

4. A material as claimed in claim 2, wherein the oil is castor oil or paraffin oil, an antioxidant is phenyl-α-naphthtylamine or octylphenol, the organic acid salt is calcium stearate, a corrosion inhibitor is an alkyltrimethylamine, the resin is polyisobutene, octylphenol-formaldehyde resin, methylpolymethacrylate, butylpolyacrylate, colophony, colophony methyl ester, colophony glycerine ester or an alkyld resin.

5. A material as claimed in claim 2, wherein the oil is castor oil or paraffin oil, an antioxidant is phenyl-α-naphthylamine or octylphenol, the organic acid salt is calcium stearate, a corrosion inhibitor is an alkyltrimethylamine, the resin is polyisobutene, octylphenol-formaldehyde resin, methylpolymethacrylate, butylpolyacrylate, colophony, hydrogenated colophony methyl ester, hydrogenated colophony glycerine ester or an alkyd resin.

References Cited

UNITED STATES PATENTS

| | | | |
|---|---|---|---|
| 2,967,164 | 1/1961 | Aries | 260—23 |
| 3,080,330 | 3/1963 | Rudel et al. | 260—28.5 X |
| 3,201,364 | 8/1965 | Salyer | 260—31.8 X |
| 3,492,258 | 1/1970 | Kremer | 260—23 X |
| 3,139,412 | 6/1964 | Sterling | 260—23 |
| 3,455,865 | 7/1969 | Bolt et al. | 117—6 X |

DONALD E. CZAJA, Primary Examiner

E. C. RZUCIDLO, Assistant Examiner

U.S. Cl. X.R.

117—6, 132 C; 260—27, 28.5 A, 31.2 R, 31.8 PQ, 32.8 A, 33.2 A, 33.4 PQ, 33.8 UA